Feb. 6, 1934.   P. M. MILLER   1,946,172
CAST SPIDER CONSTRUCTION
Filed April 17, 1930   2 Sheets-Sheet 1

Inventor
PHILIP M. MILLER
By Richey & Watts
Attorneys

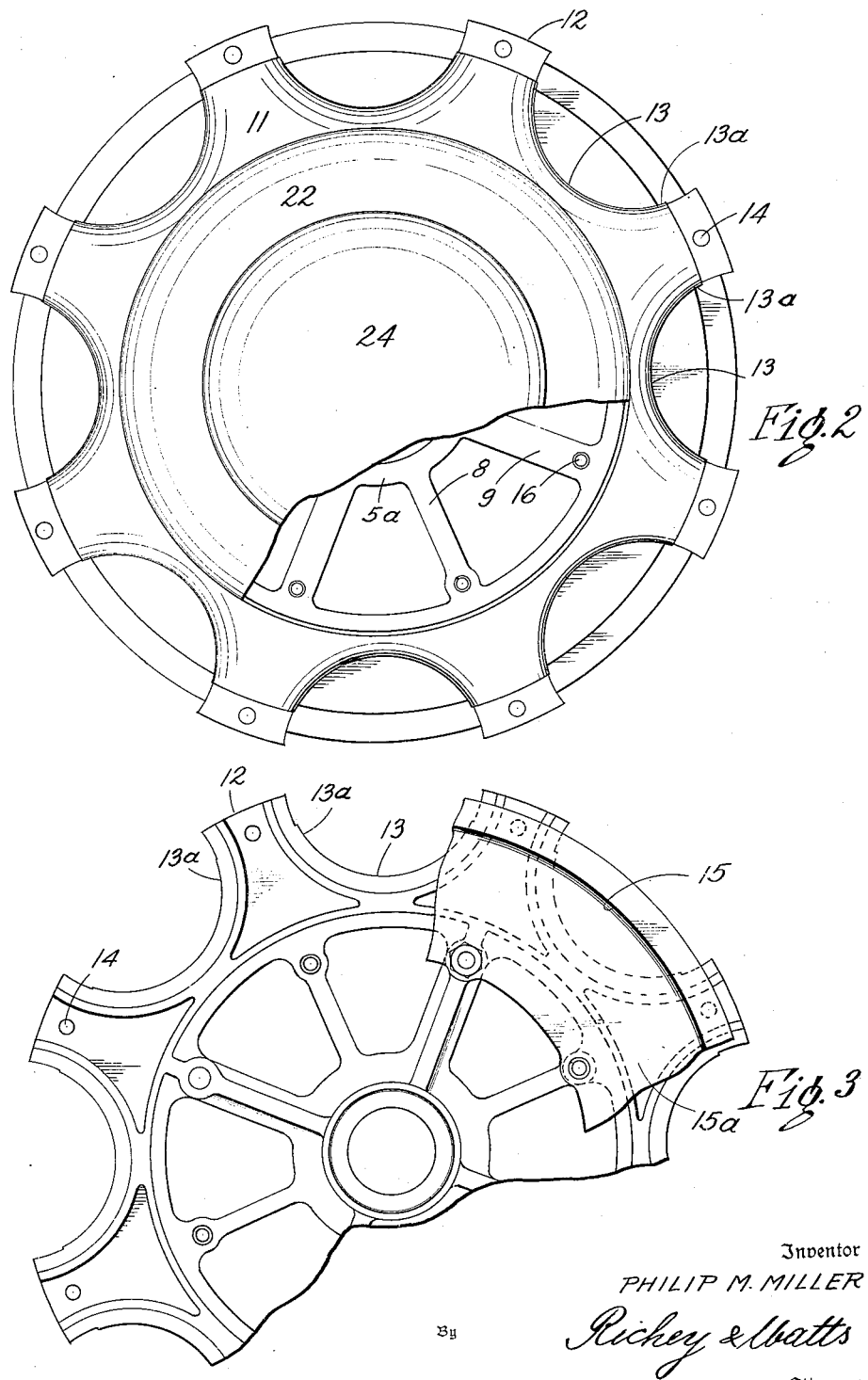

Patented Feb. 6, 1934

1,946,172

UNITED STATES PATENT OFFICE 1,946,172

CAST SPIDER CONSTRUCTION

Philip M. Miller, Cleveland, Ohio, assignor to Miller Devices Inc., New York, N. Y., a corporation of New York Application April 17, 1930. Serial No. 445,068

9 Claims. (Cl. 301—6)

This invention relates to wheels for motor vehicles, and the primary object of the same is to provide a wheel of the cast metal type which is so constructed that a minimum of metal is embodied therein, without sacrificing strength necessary to withstand the load stresses to which it may be subjected, thereby reducing the weight of the wheel to a point where it may be practically used with both light and heavy duty vehicles.

Another object of the invention is to provide an all-metal wheel assembly which is of hollow self-ventilating construction throughout, while at the same time being amply reinforced against load stresses and protected against entrance of dirt, gravel and like foreign particles into the hollow wheel body.

Another object of the invention is to provide a wheel for motor vehicles embodying a cast metal spider member which is particularly constructed to promote ease and economy in manufacture.

The foregoing and other objects and advantages will become apparent in view of the following description taken in conjunction with the drawings, wherein:

Fig. 2 is a view in outboard side elevation with the nave covering member partly broken away to show the interior nave construction; and Fig. 3 is a fragmentary view in inboard side elevation of a portion of the wheel.

Figure 1:
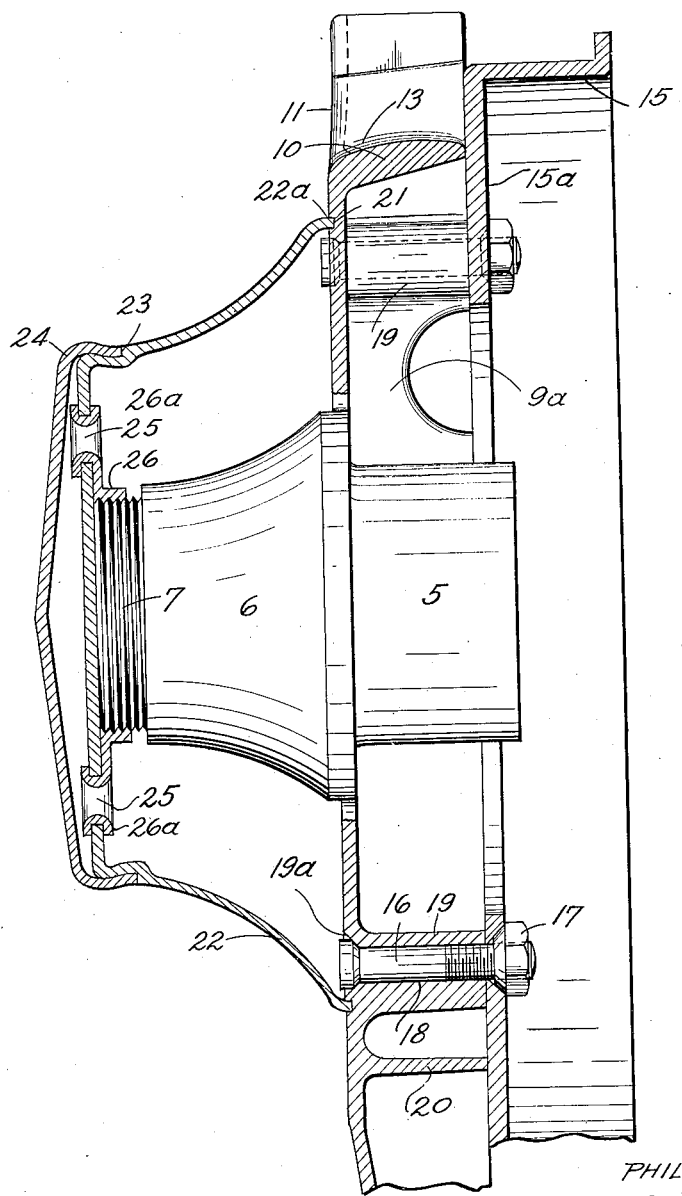
Figure 1 is a view in substantially central transverse section of a wheel embodying the features of the invention.

Referring to the drawings in detail, the spider member is of the cast metal type and is preferably cast as an integral unit. This member, as shown, comprises a transversely extended hub barrel 5 which at its outer extremity is tapered as at 6 and provided with screw threads 7. Substantially centrally of the barrel, a plurality of ribs 8 and 9 project radially outwardly and merge at their outer ends with the outboard side of an annular, transversely-extended body wall 10. Between the ribs 8 and 9 fillets 5a are built up on the barrel 5, which reinforce the structure against torque thrust at this point.

Each alternate rib 9 is provided with a transversely extended reinforcing rib 9a which at its base is joined to the hub barrel 5 and at its outer extremity is joined to a transversely extended wall 10. By this means, the central nave portion is strongly reinforced against lateral load stresses. While each of the ribs could be provided with such reinforcing means, yet to make the wheel as light as possible, each alternate rib only is provided with this reinforcing structure.

The ribs 8 and 9 preferably project radially such distance as will provide a large open central nave area which occupies the greater portion of the wheel diameter, this nave portion being of open spider-like construction which materially reduces the weight of the wheel while at the same time being strengthened against torque thrust and lateral load stresses.

The wall 10 is preferably extended transversely inwardly for substantially the entire width of the spider body, and the outboard side of said wall is projected radially at spaced points in the form of a wall 11 of reduced thickness which forms the outboard wall of each of the spokes of the spider member, said spokes being generally designated at 12. Between each of the spokes 12, said transversely extended wall 10 is arched peripherally as at 13, said arches extending radially and forming the side walls 13a of the spokes 12. By this means, channel-shaped spokes are provided with the open portion of the channel facing the inboard side of the wheel. The peripheral arches 13 are alternately spaced with respect to the ribs 8 and 9, while the spokes are in radial alinement with said ribs, thereby providing in effect a cantilever construction which materially strengthens the wheel. The end of each spoke is preferably bored as at 14 to provide means for receiving rim-locking members, not shown, which members may be of any approved type adapted for this particular type of spider member.

A brake drum 15 is provided and has the web flange 15a thereof clamped against the inboard edge of the wall 10 and the side walls 13a of the spokes 12 by means of bolts 16 and lock nuts 17, the outer ends of the ribs 8 and 9 at the point where they merge with the wall 10 being transversely bored as at 18 to accommodate the bolts 16. At the point where the transverse bolt openings 16 are formed in the metal, the wall is extended transversely as at 19 to serve as a spacing block and also as a reinforcing means, the transversely extended portion 19 being counter-sunk as at 19a to provide a socket for the heads of the bolts 16. The transverse wall at the base of each spoke which merges with the arched wall 10 is indicated at 20, said wall being of reduced thickness as will be noted by observing Fig. 1. By clamping the web 15a of the brake drum 15 against the inboard side of the spider member, the channels in the spokes are closed and the entrance of extraneous matter into the open central portion of the spider body is prevented. The channels of the spokes are substantially fully closed when rim-clamping members, not shown, are assembled on the ends of the spokes. Such members may be of the type shown in my copending application Serial No. 448,341, filed April 29, 1930.

It will be noted that the entire spider member is of open construction, with the transverse network of reinforcing walls so arranged that the casting operation is facilitated. The walls of the spider member are, in general, of substantially uniform thickness throughout, with a view toward reducing casting strains at the foundry. The spokes are relatively short and present from the exterior an attractive, symmetrical appearance.

The outboard side of the body wall 10 of the spider member is preferably formed with an annular groove 21, and a nave covering shell generally indicated at 22 is detachably secured to the end of the hub and has its edge 22a inturned and seated in said groove, thereby providing a seal at this point. The shell member 22 is preferably of such diameter as will cover the entire open nave portion of the spider member and has an arched body wall, which at its outboard extremity is preferably formed with an annular inset or shoulder 23 to accommodate an end cap 24 which is frictionally engaged over the outer extremity of said shell member and seated against said shoulder. The outboard face of the shell member 22 is preferably formed with a series of openings 25, and in these openings the metal of an internally-threaded collar 26 is engaged and turned over against the surrounding metal of the shell 22, as at 26a. The openings 25 serve as sockets for a spanner wrench or analogous tool when it is desired to remove the nave covering shell 22. The shell 22, cap 24, and collar 26 may be formed of suitable sheet metal and chrome plated to enhance the appearance of the wheel. The contour of the shell is such as to lend a finished appearance to the wheel and promote symmetrical lines. It will also be understood that the nave covering shell, in addition to preventing the entrance of extraneous matter into the hollow wheel body, also serves as a grease retainer for the hub barrel 5.

From the foregoing, it will be seen that I have provided a wheel of the cast metal spider type which is of hollow construction throughout, the central nave portion being formed with a ventilating chamber which tends to rapidly dissipate heat generated while the wheel is in service on the road, the spider member being economically cast and, due to its particular construction, may have its weight reduced to a point where the wheel is adaptable for both light and heavy duty vehicles, while at the same time being strongly reinforced against load stresses while in service on the road.

It will be understood that certain structural changes and modifications could be made without departing from the scope of the invention as defined by the appended claims.

Having thus described my invention, what I desire to secure by Letters Patent is:

1. In a metal wheel for motor vehicles, a free spoked spider member adapted to be cast as an integral unit and formed with a transversely-extended hub proper, spaced ribs projecting radially from said hub leaving a relatively large open area in the central portion of the spider member, said ribs merging with an annular wall which is formed with an arched periphery, the wall defining said arches flaring radially to provide relatively short spokes which are open toward the inboard side of the wheel, the spokes being in radial alinement with the ribs and together with the arches forming a cantilever construction which adds strength to the wheel, each alternate rib being formed with auxiliary ribs for reinforcing said annular wall, each of said alternate reinforced ribs being formed with transversely extending bolt-receiving portions where they merge with said wall, and means extending through said portions for securing a brake drum to the spider member.

2. A wheel assembly for motor vehicles comprising a cast metal spider member of integral construction and formed with a hub barrel and ribs which project radially from said barrel in spider formation for the greater portion of the wheel diameter, to thereby reduce the amount of metal comprised in the spider and provide a central ventilating chamber, said ribs at their outer ends merging into the outboard side of an annular transversely-extended spoked body wall which is projected radially in arched formation defining relatively short hollow spokes, a brake drum secured to the inner side of the wheel closing off the inboard side of the spokes, and a nave-covering shell demountably secured to the hub and covering the open central area of the wheel.

3. A wheel assembly for motor vehicles comprising a cast metal spider member of integral construction and formed with a transversely-extended hub barrel and a nave portion which is of open spider-like construction for the greater portion of the wheel diameter, to thereby reduce the amount of metal comprised in the spider and provide a central ventilating chamber, the spoked body of the spider consisting of a transversely extended circumferentially arched wall which is joined to the ends of said ribs at its outboard side and is formed with a series of radial projections having rounded, inwardly-turned flanges defining the spokes of the wheel, a drum member having a reduced web which is clamped against the inboard side of the spider member closing off the open sides of said spokes, and a shell connected to the end of the hub barrel and flaring outwardly and covering the open nave area of the spider member.

4. In a metal wheel for motor vehicles, a free spoked spider member of cast metal adapted to be cast as an integral unit and formed with a transversely-extended hub proper, spaced ribs projecting radially from said hub leaving an open nave area for the greater portion of the spider member, to thereby lighten the said member and provide a large central ventilating chamber, said ribs merging with an annular wall which is extended transversely for the full width of the spider member and is formed with an arched periphery and flared radially between said arches to provide relatively short hollow spokes, a drum member having a reduced web which is clamped against the said annular wall, and a shell detachably secured to the end of the hub and flaring outwardly and covering the open area of the spider member.

5. In a metal wheel for motor vehicles, a free spoked spider member of cast metal adapted to be cast as an integral unit and formed with a transversely-extended hub proper, spaced ribs projecting radially from said hub leaving an open nave area for the greater portion of the spider member to thereby lighten the said member and provide a large central ventilating chamber, said ribs merging with an annular wall which is extended transversely for the full width of the spider member and is formed with an arched periphery, the wall defining said arches flaring radially to provide relatively short spokes which are open toward the inboard side of the wheel, the spokes being in radial alinement with the ribs and together with the arches forming a cantilever construction which adds strength to the wheel, a drum member clamped against the wheel with its web closing the openings in the spokes, and a shell secured to the end of the hub and flaring outwardly and covering the open portion of the spider member.

6. In a wheel for motor vehicles, a transversely extended hub having formed integrally therewith a series of ribs which project radially in spider formation, leaving a relatively large open central nave area for the greater portion of the wheel diameter, said ribs at their outer ends merging into an annular wall formed with a series of peripheral arches which are extended to form the spokes of the wheel, a combination grease-retainer and nave-covering shell assembly having an end wall provided with an inwardly projecting, interiorly-threaded, hub-engaging member and an arched side wall which flares outwardly and seats in a groove formed in said annular wall, and a cap frictionally clamped on the end of the shell member to complete the symmetrical contour of the latter.

7. In a wheel for motor vehicles, a transversely extended hub having formed integrally therewith a series of ribs which project radially in spider formation leaving a relatively large open central area for the greater portion of the wheel diameter, said ribs at their outer ends merging into an annular wall formed with a series of hollow peripheral arches which are extended to form the spokes of the wheel, and a combination grease retainer and nave-covering shell assembly mounted on the outboard side of the wheel, said assembly comprising a hub-engaging grease retaining member and a nave-covering shell proper formed with a substantially plane end surface and a surrounding arched outwardly flaring side wall having its edge seated in a groove formed in the said annular wheel body wall, the outboard end of said shell being formed with an annular inset portion and a shoulder, and a cap frictionally clamped on the end of said shell against said shoulder to complete the symmetrical contour of the shell member.

8. In a metal wheel for motor vehicles, a spider member formed with a transversely-extended hub barrel and a series of radially-extended ribs merging into an annular body wall, said ribs being extended to provide a relatively large open central nave area for the greater portion of the wheel diameter and thereby lighten and ventilate the wheel assembly as a whole, said body wall being formed with an annular groove in the outboard side thereof, and a combination grease-retainer and nave-covering shell proper formed with an end wall provided with means for engaging the outboard end of the hub barrel and a surrounding outwardly-flaring side wall having its edge seated in said annular groove, and a cap fitted on the end of the shell to complete the symmetrical contour of the latter.

9. A metal wheel assembly for motor vehicles comprising a cast metal spider member formed with a transversely-extended hub barrel and a series of radially-extended ribs merging into an annular body wall, said ribs being extended to provide a relatively large open central nave area for the greater portion of the wheel diameter and thereby materially lighten the wheel spider and ventilate the wheel assembly as a whole, and a combination grease-retainer and nave-covering shell assembly mounted on the outboard side of the spider member, said assembly comprising a nave-covering shell proper formed with an end wall having a substantially plane surface which lies over the outer end of the hub barrel and a surrounding arched outwardly-flaring side wall having its peripheral edge engaged with the side of the spider body wall, a screw-threaded ring secured to the end wall of the shell member and engaging the end of the hub to hold the shell assembly in place and provide a grease-retainer, and a cap frictionally engaged over the outer end of the shell proper and completing the symmetrical contour of the assembly.

PHILIP M. MILLER.